US005743954A

United States Patent [19]
Rowland et al.

[11] Patent Number: 5,743,954
[45] Date of Patent: Apr. 28, 1998

[54] METHOD FOR CONTINUOUS REFRACTORYLESS CALCINING OF GYPSUM

[75] Inventors: George E. Rowland, Naperville, Ill.; Michael L. Cloud, Canton; Daniel J. Milligan, Watonga, both of Okla.

[73] Assignee: United States Gypsum Company, Chicago, Ill.

[21] Appl. No.: 382,612

[22] Filed: Feb. 2, 1995

[51] Int. Cl.$^6$ ........................................ C04B 11/00
[52] U.S. Cl. .................. 106/783; 106/772; 423/171; 423/172; 423/555; 432/14; 432/102; 432/197; 432/114
[58] Field of Search ...................... 106/772, 783; 423/172, 555, 171; 432/14, 197, 102, 209, 114

[56] References Cited

U.S. PATENT DOCUMENTS

| | | |
|---|---|---|
| 2,261,872 | 11/1941 | Choate . |
| 3,307,840 | 3/1967 | Conroy, Jr. . |
| 3,307,915 | 3/1967 | Conroy et al. .......................... 432/209 |
| 3,669,435 | 6/1972 | Silverberg . |
| 4,113,836 | 9/1978 | O'Connor . |
| 4,161,390 | 7/1979 | Page et al. ............................. 432/102 |
| 4,176,157 | 11/1979 | George et al. ......................... 423/171 |
| 4,188,186 | 2/1980 | Ladwig . |
| 4,215,981 | 8/1980 | von Dreusche, Jr. . |
| 4,227,873 | 10/1980 | Manshausen et al. . |
| 4,238,283 | 12/1980 | Kinkade et al. ........................ 106/783 |
| 4,522,587 | 6/1985 | Miller . |
| 4,576,573 | 3/1986 | Ruehenbeck . |
| 4,744,961 | 5/1988 | Bounini ................................. 423/171 |
| 4,915,623 | 4/1990 | Ball et al. .............................. 432/14 |
| 5,007,825 | 4/1991 | Williams . |
| 5,011,668 | 4/1991 | Ball et al. . |
| 5,139,749 | 8/1992 | White . |

FOREIGN PATENT DOCUMENTS

| | | |
|---|---|---|
| 169737 | 9/1904 | Germany . |
| 1018464 | 1/1966 | United Kingdom . |

*Primary Examiner*—Michael Marcheschi
*Attorney, Agent, or Firm*—Richard B. Hoffman; John M. Lorenzen

[57] ABSTRACT

A method and apparatus is disclosed for the continuous calcining of gypsum material in a high-efficiency, refractoryless kettle preferably heated by a multiple series of separate immersion tube burner coils, each coil operating within a specific calcining zone inside the kettle. The lowest, i.e., initial, burner tube coil is formed with a low profile to permit use of a small initial gypsum charge, and hence, a quick kettle start-up cycle. That low profile initial burner design also helps keep the agitator motor's load at a minimum during cycle start-up. Due to the immersion tube burner coil construction, no refractory structure for the kettle is required. Also, no separate hot pit structure is required, as the kettle is used to merely hold the material being calcined and no residual heat is present. A relatively thin kettle can be constructed, as it need only withstand relatively low operating temperatures. The kettle's staged, interiorly-disposed burner tube coils act to directly transfer burner tube heat to the kettle's contents, and the coils exhaust exteriorly of the kettle. The present calcining method and apparatus permits substantially improved tonnage output of calcined material, for a kettle of a given size. A modification to the present apparatus includes structure for recovering and recycling a portion of the spent burner gases, and also separate structure for forced aeration air, both preferably for introduction through the kettle bottom. One alternate embodiment concerns a differently-shaped kettle design. Another alternate embodiment concerns a modified kettle which uses a single immersion burner tube coil to provide the total heating of the kettle's contents, for use in certain calcining applications.

12 Claims, 7 Drawing Sheets

METHOD FOR CONTINUOUS REFRACTORYLESS CALCINING OF GYPSUM

This invention relates to a method and apparatus of calcining of gypsum, and more specifically, to a method and apparatus for continuous calcining of gypsum using a series of immersion tube burners within a refractoryless kettle.

BACKGROUND OF THE INVENTION

Calcining of crushed gypsum comprises converting calcium sulfate dihydrate by heating into calcium sulfate hemihydrate, better known as stucco. Prior calcining apparatus and methods have taken various forms. Traditionally, the calcining of gypsum has occurred in a large kettle, having a thickened dome-shaped bottom, against which a gas-fired flame is directed, with the kettle and burner flame being enclosed in a suitable refractory structure. There is usually an associated hot pit into which the calcined material is fed. The kettle must withstand temperatures in the 2,000°–2,400° F. range, hence requiring expensive fire box steel plate on its domed bottom, which was typically 1¾ inches thick. U.S. Pat. No. 3,236,509 typifies this type construction. This approach had numerous disadvantages, such as the extreme waste of hot burner gases, and the associated refractory brick enclosure which, when repairs or kettle shut-down were needed, first required a lengthy cool-down period.

Other calcining kettles, of the general type described above, have included supplemental submerged combustion designs where exhaust gases from the gas-fired burners were discharged directly into the kettle contents. Here, the gas flame directly impinged against the material being calcined, and there was an increased possibility of creating so-called "dead burn" material, i.e., insoluble anhydrite. U.S. Pat. Nos. 4,176,157 and 4,238,238 typify that type approach. Additionally, other prior art calcining kettles, of the general type described above, included a series of cross tubes which passed generally horizontally completely through the kettle, allowing the hot gases within the refractory structure and surrounding the kettle to be supplementally directed through the tubes, and thus, through the kettle contents to further heat the same. U.S. Pat. Nos. 3,307,915 and 4,163,390 typify this type kettle construction. There have also been horizontally-aligned, rotary calcining structures; U.S. Pat. No. 3,871,829 typifies this type approach.

Besides the above kettle constructions which normally require expensive refractory structure, there have also been refractoryless kettles using the submerged combustion principle, including those having auxiliary draft tube structure encompassing the main burner tube, so as to reduce formation of dead-burned insoluble anhydrite. U.S. Pat. No. 4,626,199 typifies this type construction. Additionally, there are so-called refractoryless conical kettles with various types of submerged combustion heating systems, again with the attendant risk of creating non-uniform stucco and dead burn material. U.S. Pat. Nos. 4,629,419 and 4,744,961 typify such conical kettle constructions. More recent calcining kettle modifications have included so-called "boost" burner constructions, including electrical boost calrods, see U.S. Pat. No. 4,744,963, and gas-fired boost burner designs, both added as supplemental heaters to traditional refractory-type kettle constructions.

The present invention overcomes the disadvantages of the prior art calcining kettle constructions and calcining methods, in several respects. The present invention includes the method of staging the location of multiple immersion tube burner coils within a calcining kettle; forming the initial, i.e., lowest, burner assembly of a low profile design, to permit quick kettle start-up; initially charging the vessel with gypsum material to substantially cover the lower burner unit; energizing the lower burner unit to heat the initial fill of material; thereafter continuing to fill the kettle with successive additional loads of material to cover the successive higher-staged burner tube assemblies; and energizing the successive higher burner tube assemblies to establish a continuous cycle of ground gypsum material conveyed to and calcined in the kettle.

The present refractoryless calcining kettle utilizes a series of immersion tube burner assemblies, preferably formed in, but not limited to, horizontally-aligned, serpentine-like coils, with each burner tube assembly located within a specific calcining zone within the kettle. Each burner tube exhausts exteriorly of the kettle to a common flue stack. The kettle is constructed of steel material of sufficient thickness to withstand the calcining temperatures required, and is preferably flat-bottomed. Thus, the kettle of the present invention, and its associated housing structure, can be of less overall vertical dimensions, as no dome-shaped bottom construction or underlying burner apparatus is required. Further, no extra fire-box steel cladding is required for the kettle bottom (such as was previously required to withstand the highly elevated temperatures at which prior art kettles had to operate). Since all heating of the gypsum material occurs within the kettle, and since there is no external heat applied to the kettle, no separate refractory structure is required. Also, since no hot burner gases directly impinge on the gypsum material being calcined, but instead, the immersion tube burner gases exhaust from the burner tube coils exteriorly of the kettle through a flue stack, low capacity combustion air blowers can be utilized for the tube burners. This results in reduced initial capital expenditures.

Further, because the present invention uses a series of coil-shaped immersion tube burner assemblies which are mounted substantially within the calcining kettle, essentially all the burner-generated heat is transferred to the kettle contents, with attendant increased heat transfer efficiency.

Further yet, since additional burners and heat exchangers, i.e., burner tube coils, can be installed within the presently disclosed kettle vessel, even more heat transfer area can be installed in the same size kettle resulting in yet higher tonnage output capacity for the kettle. Thus, a greater tonnage output, for the same size kettle, can be achieved with the present kettle and burner design than with any known prior art design. As modifications to the present invention, additional flue gas recycling and aeration equipment can be installed adjacent the interior kettle bottom, to help with further heating and circulating of the kettle's contents.

An alternate embodiment comprises, instead of a series of immersion tube burner coils, a single burner tube coil mounted interiorly of a kettle, and still exhausting exteriorly of the kettle, to provide the total heat transfer for the kettle's contents. Such a single burner tube coil kettle is suitable for use in specific applications where a smaller capacity kettle is sufficient.

It is a primary object of the present invention to provide a calcining kettle utilizing at least one, interiorly-disposed immersion tube burner coil, which coil exhausts to the kettle's exterior, and where the kettle's contents are substantially entirely heated by that burner tube coil or coils.

It is another object of the present invention to provide a calcining kettle having multiple internally-disposed immersion tube burner assemblies, each preferably formed as a horizontally-aligned coil and operating in a separate calcining zone within the kettle.

It is a further object of the present invention to utilize as the lowest or initial immersion tube burner assembly one which is of a low profile, serpentine-like coil design, so as to permit quick initial start-up cycle for the calcining kettle, as well as to require a lower horsepower for the agitating drive device during cycle start-up.

It is a further object to provide a calcining kettle having no separate refractory enclosure structure, and where the kettle has reduced material requirements due to the substantially reduced temperatures at which it operates.

It is a yet further object of the present invention to have a calcining kettle that does not require a heavy duty, domed-bottom construction and eliminates any burner construction beneath the kettle, such that kettle-bottom aeration can be utilized.

It is a still further object to provide a calcining kettle construction which permits a substantially increased tonnage output of calcined material, for the same size kettle.

It is a still further object to provide a kettle design substantially teardrop-shaped in cross section which permits an elongated initial straight section for the respective immersion burner tube assemblies. Alternatively, the kettle design could instead be of a circular cross section design, with exteriorly-mounted burner boxes.

The means by which the foregoing and other objects of the present invention are accomplished and the manner of their accomplishment will be readily understood from the following specification upon reference to the accompanying drawings, in which.

Figure 9:
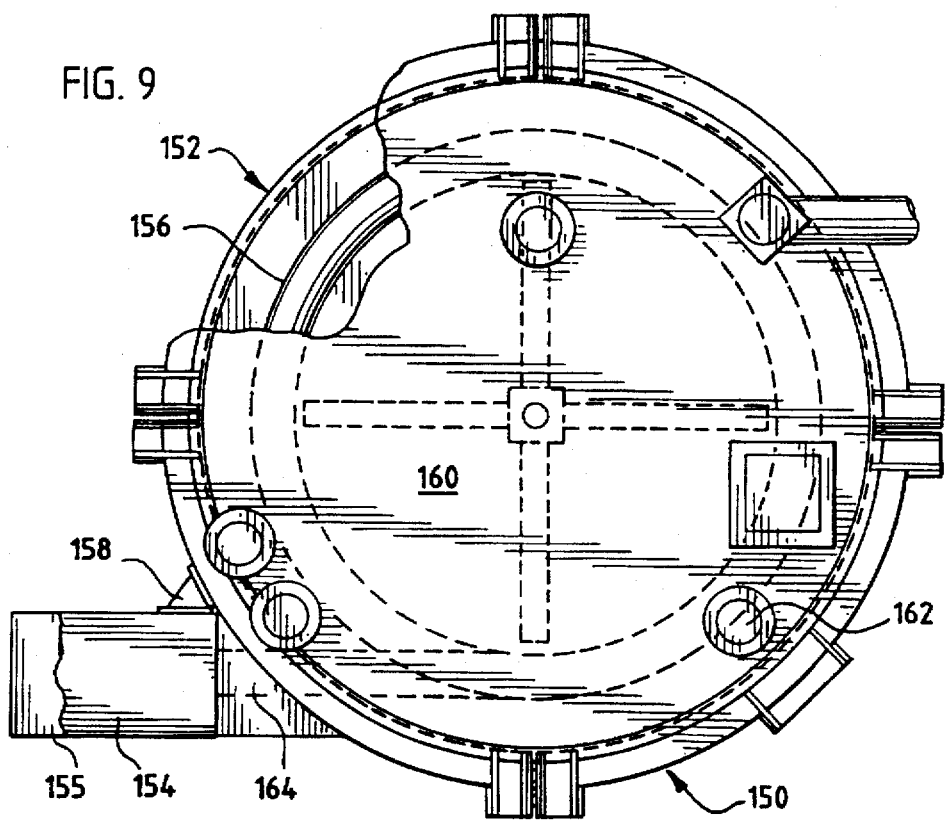
Figure 10:
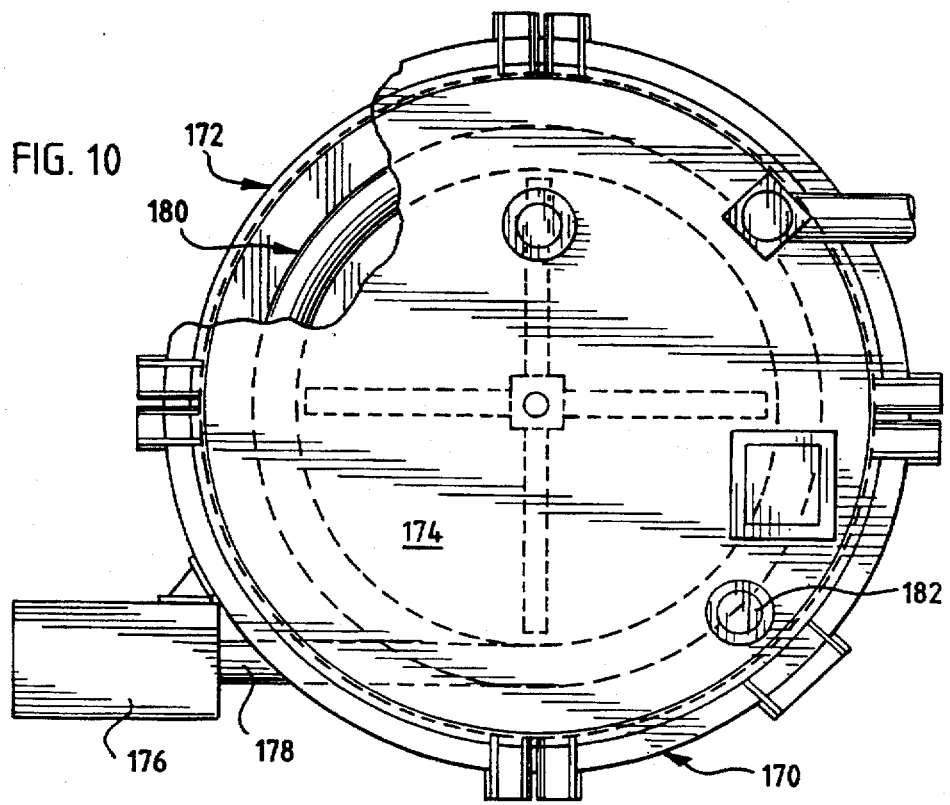

FIG. 9 is a top plan view of an alternate embodiment of the calcining kettle apparatus of the present invention, with certain components removed for better viewing, and depicting a differently-shaped kettle shell and a modified multiple immersion tube burner arrangement; and FIG. 10 is a top plan view of yet another alternate embodiment of the present invention, with certain components removed for better viewing, and depicting a calcining kettle having a single immersion tube burner coil for certain calcining applications.

DESCRIPTION OF THE PREFERRED EMBODIMENT

Figure 1:
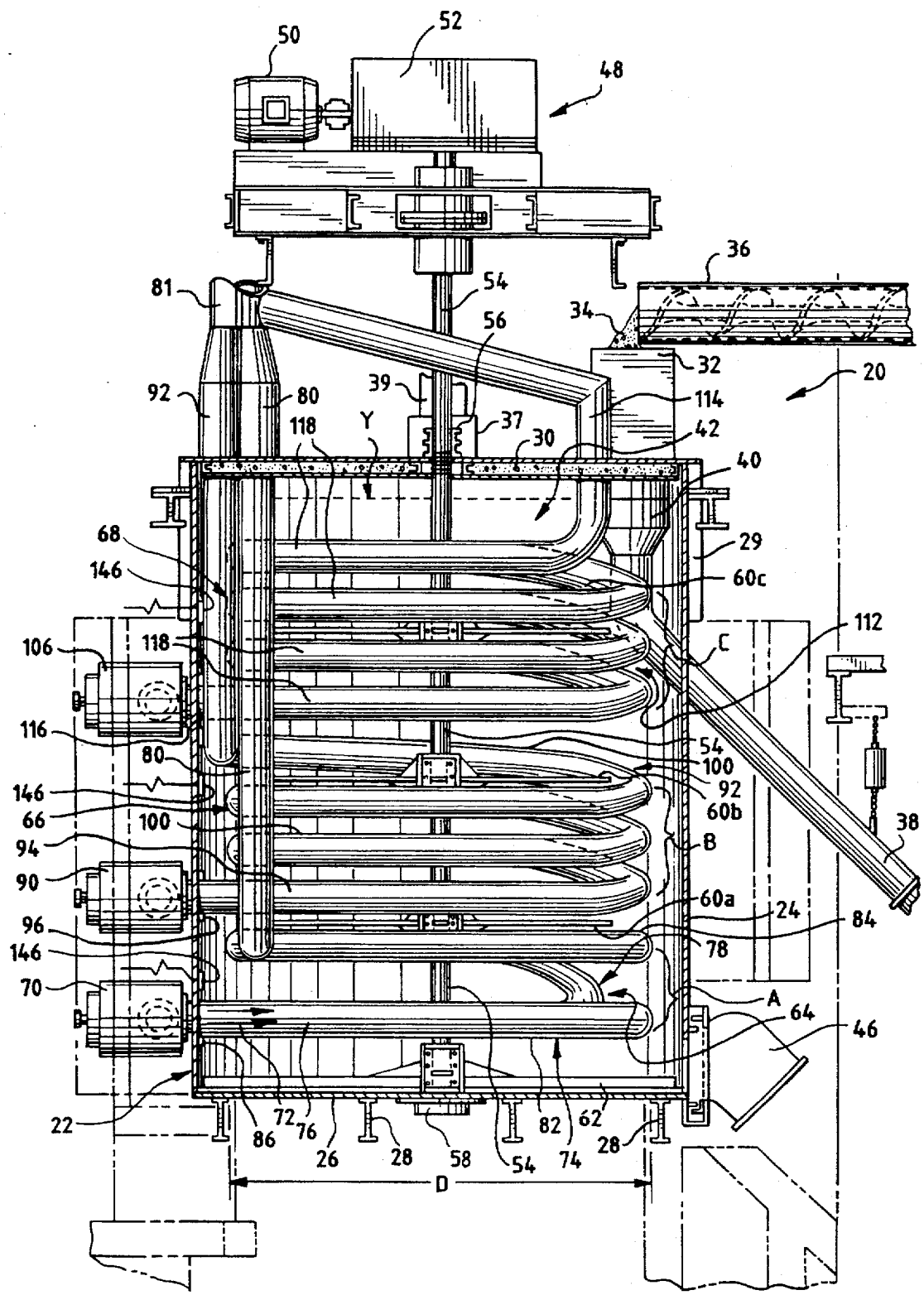
FIG. 1 is a side elevation view, partly in section, of the improved calcining kettle construction of the present invention, with kettle support structure shown in phantom.
Figure 7:
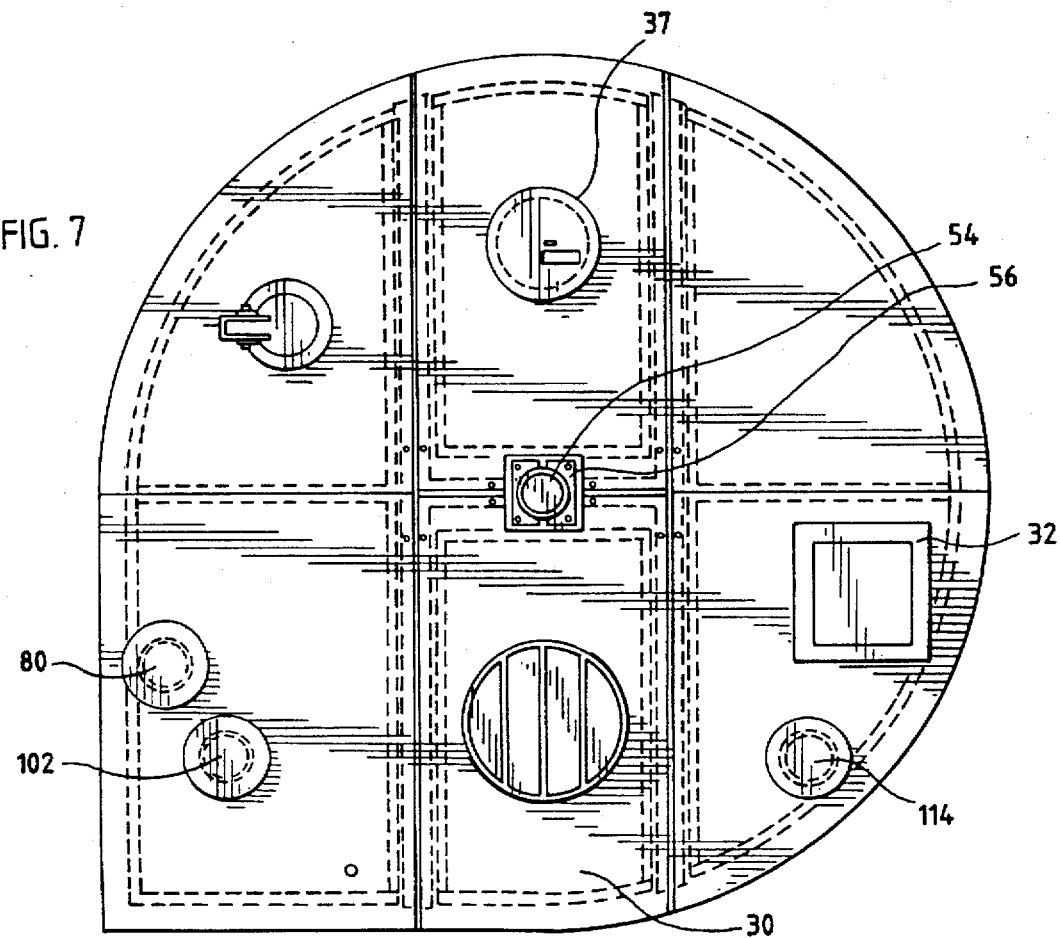
FIG. 7 is a top plan view of the cover of the kettle of FIG. 1.

Having reference to the drawings, wherein like reference numerals indicate corresponding elements, there is shown in FIG. 1 an illustration of an improved calcining kettle apparatus generally denoted by reference numeral 20. The improved kettle apparatus 20 includes a calcining kettle 22 having a generally teardrop-shaped kettle shell 24 (in cross section) and a flat bottom 26, mounted upon suitable structural supports 28. The kettle 22, for manpower safety reasons, preferably has its sidewall exterior covered with a suitable protective insulation, see the sheathing 29 partially depicted in FIG. 1. The kettle apparatus 20 also includes a matching teardrop-shaped kettle cover 30 (see FIGS. 1, 2 and 7). Cover 30 carries a kettle input riser 32 to receive a continuous charge of ground gypsum material 34, the latter being delivered by a conventional kettle feed conveyor 36. A dust collector riser port 37, connected to a dust collector supply pipe 39, is also carried by cover 30. An overflow-type outlet tube 38 partially extends through the side wall of kettle shell 24 and terminates at its upper end in an overflow outlet 40; together the outlet 40 and outlet pipe 38 comprise a calcined material recovery means. During the calcining process, the processed calcined gypsum material (designated by numeral 42 in FIG. 1), being lighter rises within kettle 22 and overflows into outlet 40. In a conventional manner, the outlet 40 acts to establish an upper level (designated by reference letter "Y") for the calcined gypsum 42 within kettle 22.

The outer or lower end of overflow discharge tube 38 connects with a suitable outlet tube 44. A kettle discharge connector or dump gate 46 is mounted at the lower edge of kettle shell 24 (see right lower section thereof in FIG. 1) to permit, when desired, discharge of the entire contents of the kettle 22. This can be either through a material discharge tube or into an associated existing hot pit structure (neither shown).

A mixing means is used to mix the kettle's contents during the calcining operation. More specifically, mounted atop the improved kettle apparatus 20 of the present invention is an agitator drive assembly, generally denoted by reference number 48; it comprises a motor 50, a gear reducer 52, and a drive shaft 54. The drive shaft 54 extends downwardly through a bearing seal block 56 mounted on kettle cover 30; shaft 54 is rotatably mounted at its other end in a journal bearing 58 affixed to the kettle bottom 26. A series of kettle contents sweeps or mixer blades 60A, 60B, and 60C, each axially tilted to force material downward, are respectively mounted to the rotating drive shaft 54, each for agitating operation within different calcining zones (described more fully below) located within the kettle 22. A scraper bar or rake 62, affixed to shaft 54, rotates adjacent the bottom of the kettle 22. The blades of scraper bar 62 are tilted so as to upwardly plow and mix the kettle contents located adjacent the kettle bottom 26 into the adjacent calcining zone.

As best seen in FIGS. 1, 4-6, a series of burner tube assemblies are disposed, preferably but not limited to being horizontally-aligned, for operation within kettle 22. They are generally denoted as the initial (or lower) burner tube or heat exchanger assembly 64, middle burner tube assembly 66, and upper burner tube assembly 68. As noted, each of the three burner tube assemblies 64, 66, and 68 are formed as a coil-type assembly, and are each placed within a specific calcining zone of the kettle 22. For example, lower burner tube assembly 64 operates within the lower calcining zone denoted generally by reference letter A in FIG. 1, while middle burner tube assembly 66 operates within intermediate calcining zone B, and upper burner tube assembly 68 operates within the upper calcining zone C.

Viewing FIGS. 1 and 4, the lower burner tube assembly 64 comprises an immersion tube burner 70 mounted exteriorly of the kettle shell 24. The burner 70 produces a gas-fired flame generally depicted by the arrows 72. An immersion burner tube coil, generally denoted by reference numeral 74, comprises an initial tube section 76 which is connected to the output of burner 70 and sealably extends through the kettle shell wall 24. Burner tube coil 74 also has an intermediate coil section 78 which terminates in a vertical riser tube 80. Spent burner gases, which exhaust from the riser tube 80 extending above the kettle cover 30, are collected into a common flue stack 81 (see FIGS. 1 and 8).

Figure 4A:
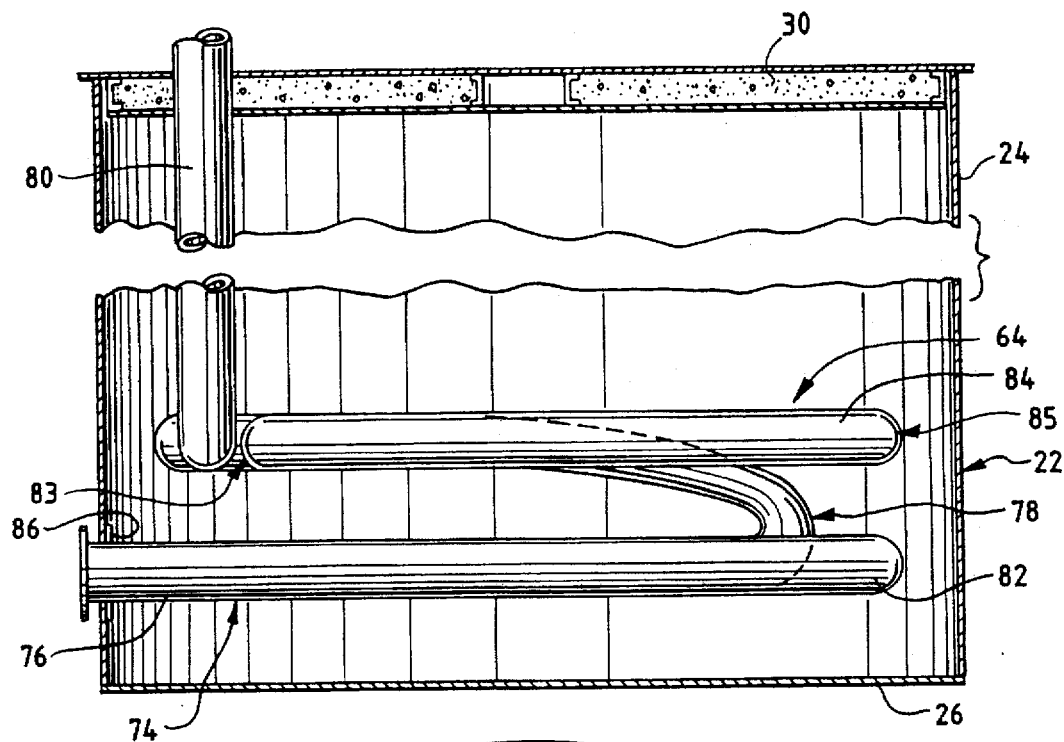
FIG. 4A is a side elevation view of the lower burner tube coil of the calcining kettle of FIG. 1.
Figure 4B:
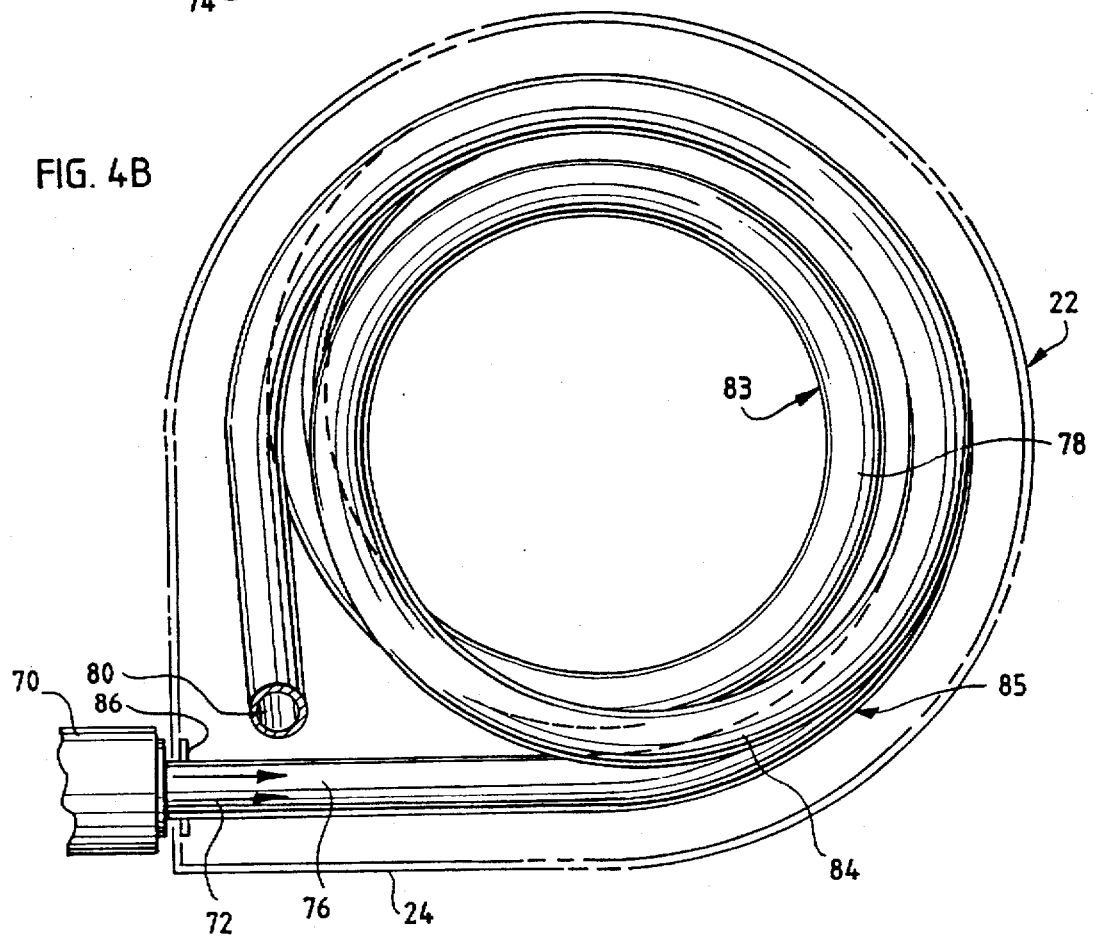
FIG. 4B is a top plan view of the lower burner tube coil of FIG. 4A.

Preferably, the lower burner tube assembly 64 is formed in a serpentine-like, low profile design. This is in contrast to the taller, more cylindrically-shaped coil designs preferably used for the middle and upper burner tube assemblies 66, 68. That is, lower burner tube assembly 64 is preferably formed of a low profile design having, for example, as illustrated, only two coil levels, namely lower coil level 82 and upper coil level 84. Again, both coil levels 82, 84 are generally horizontally-aligned; they are connected by an intermediate coil section 78. As seen in FIGS. 4A and 4B, each of the lower and upper coil levels 82, 84 have inner and outer coil sections, generally designated by numerals 83 and 85 (see FIG. 46). The result is that the lower burner tube assembly 64 has a squatter, tighter, more serpentine-like coil design, whereby calcining zone A is vertically shorter, i.e., more shallow or "squat", than are zones B and C.

Nevertheless, even though the lower burner tube assembly 64 has a compact vertical height (as located within the kettle calcining zone designated by letter A), there is still sufficient heating surface area provided by the configured lower burner tube coil 74 to transfer the required heat to calcine, or at least initiate the conversion of, the gypsum 34 deposited within calcining zone A. That is, the combination of the two serpentine-like coil levels 82, 84, each with separate inner and outer coil sections 83, 85, results in sufficient overall heater tube surface area to allow the gas-fired heat generated by burner 70 to be substantially transferred through coil 74 into the gypsum material 42 located in calcining zone A.

As seen in FIGS. 4A and 4B, the initial straight burner tube section 76 of coil 74 is supported at its inlet end by a mounting plate 86 carried by kettle shell 24. Preferably, that straight tube section 76 extends a sufficient distance into the kettle 22 such that the gas-fired flames 72 do not impinge directly upon any cross wall portion of lower burner tube coil 74. This acts to greatly reduce any unwanted wear and potential damage to the tube coil 74. That initial straight tube section 76 is preferably formed of a suitable stainless steel material, such as Stainless Schedule 80 pipe. The remainder of the burner tube coil 74, including the vertical riser tube 80, is preferably formed of a mild steel material, such as Schedule 80 pipe.

Figure 5A:
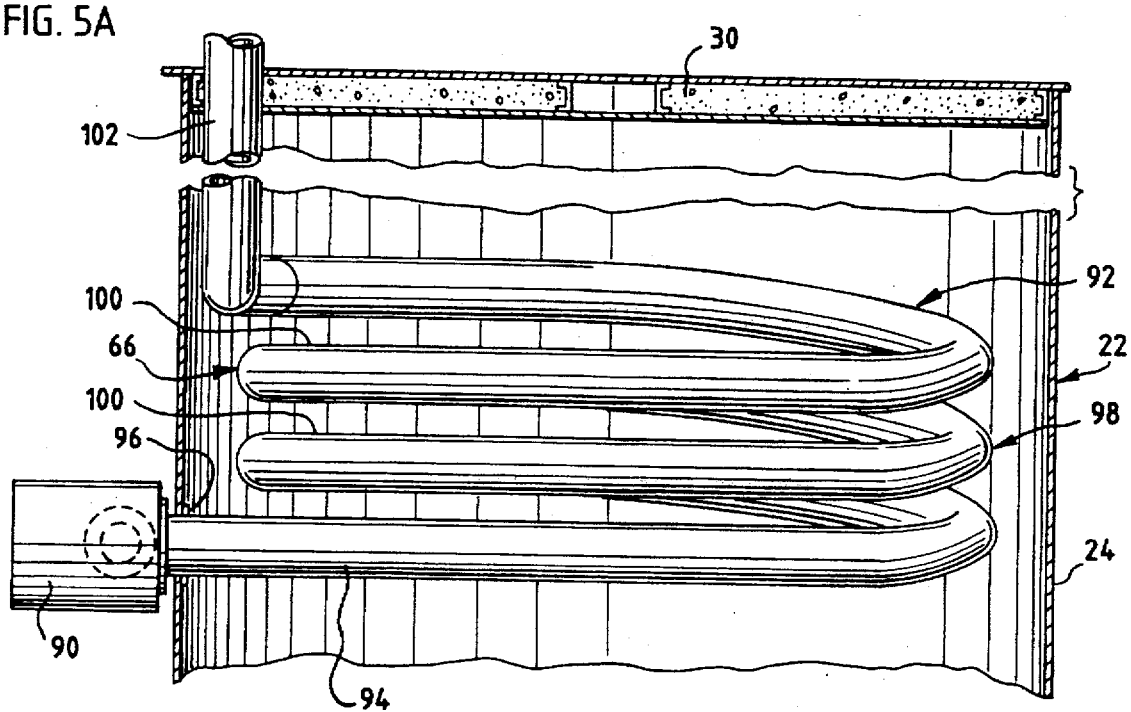
FIG. 5A is a side elevation view of the middle burner tube coil of the kettle of FIG. 1.
Figure 5B:
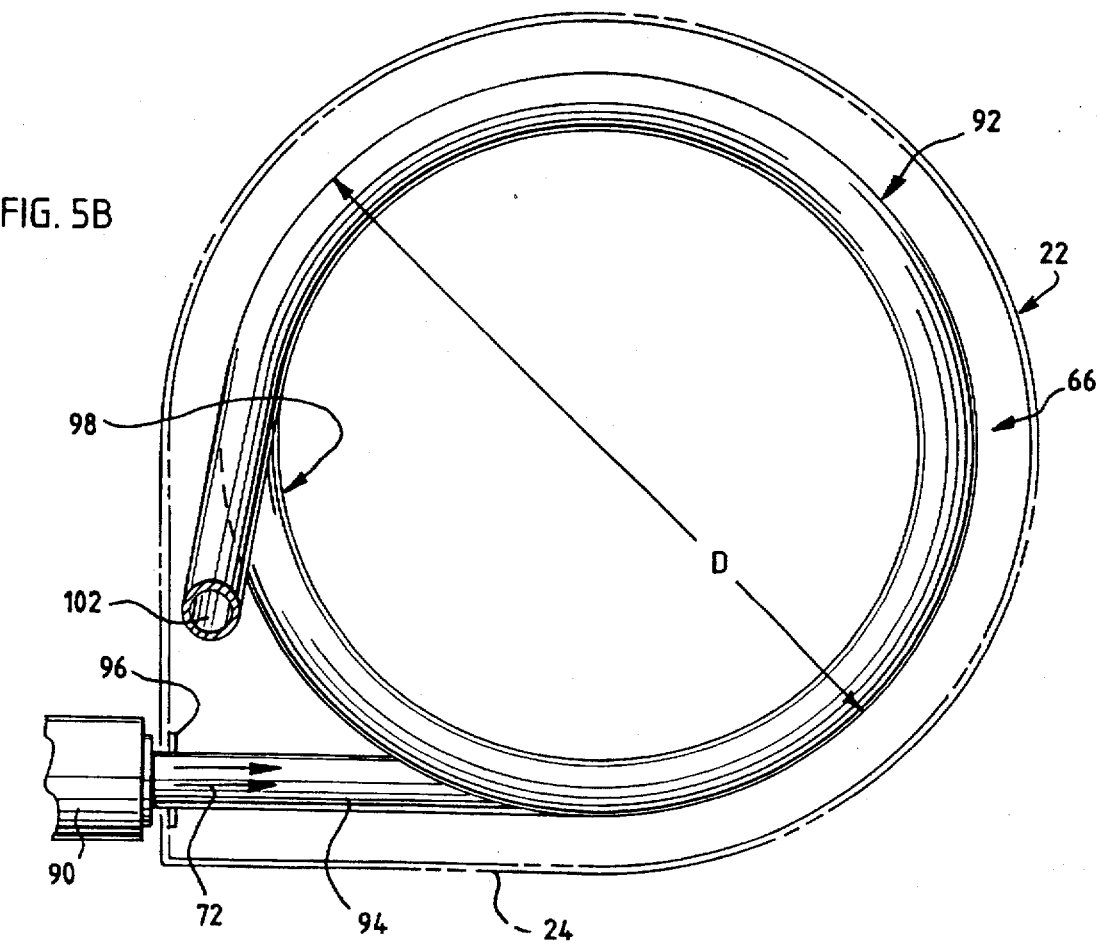
FIG. 5B is a top plan view of the middle burner tube coil of FIG. 5A.

The middle tube burner assembly 66 is depicted in FIGS. 1 and 5A, 5B. As with lower burner tube assembly 64, a middle immersion tube burner 90 is mounted for operation on the kettle shell wall 22 above, and in vertical alignment with, the lower burner 70. A middle burner tube coil, designated by reference numeral 92, has an initial straight section 94 mounted via a mounting plate 96 for extension through kettle shell wall 22 to connect with the outlet of the middle burner 90. Coil 92 is formed of a taller, generally cylindrically-shaped central spiral section 98 having four horizontally-aligned coil levels 100, as contrasted to essentially the more compact, two coil levels 82, 84 of the lower burner tube coil 74. Middle coil 92 terminates in a vertical riser 102 for connection to the common flue stack 81. Again, unlike lower burner coil 74, the middle burner tube coil 92 preferably does not utilize inner and outer coil sections 83, 85.

Figure 2:
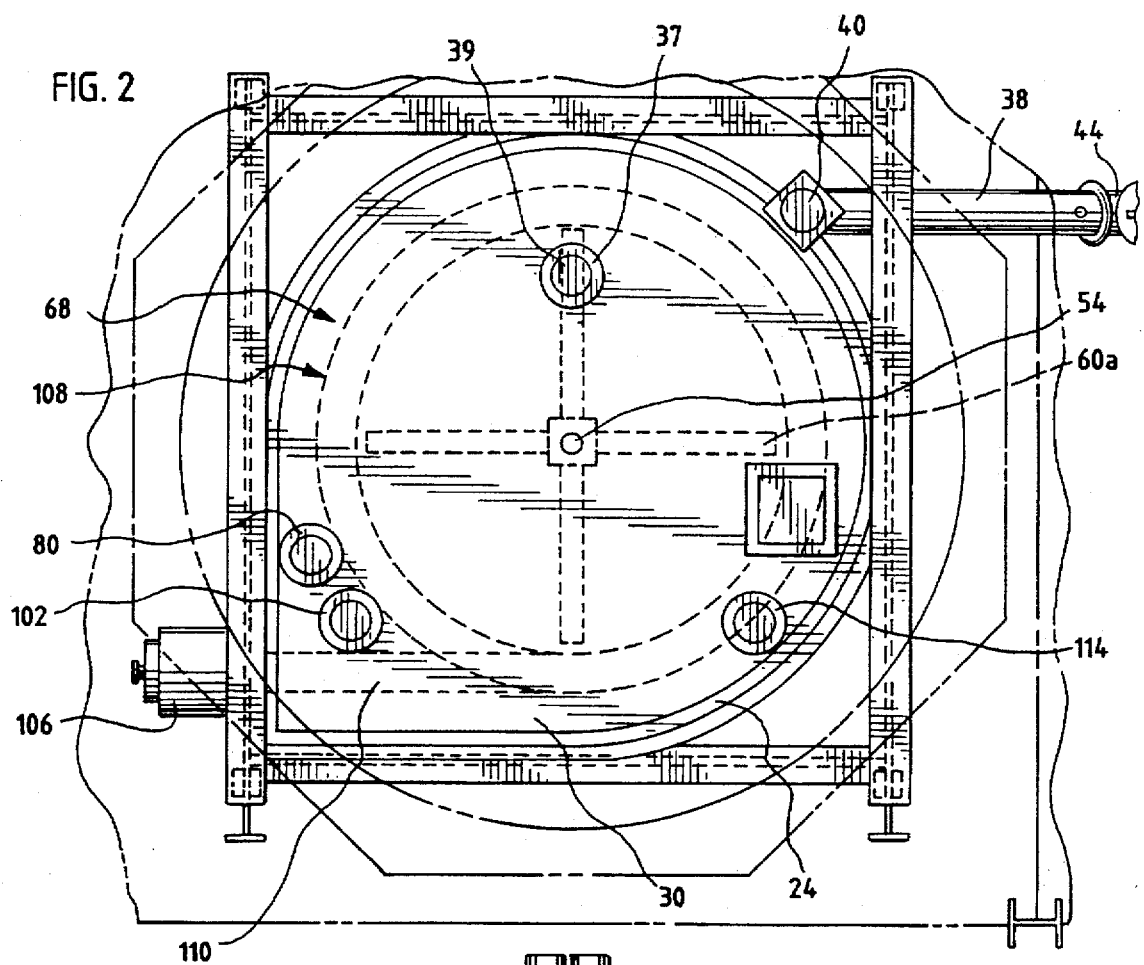
FIG. 2 is a plan view of the calcining kettle of FIG. 1, shown with the kettle cover partially broken away, and certain drive motor and burner tube apparatus removed, for better viewing.
Figure 3:
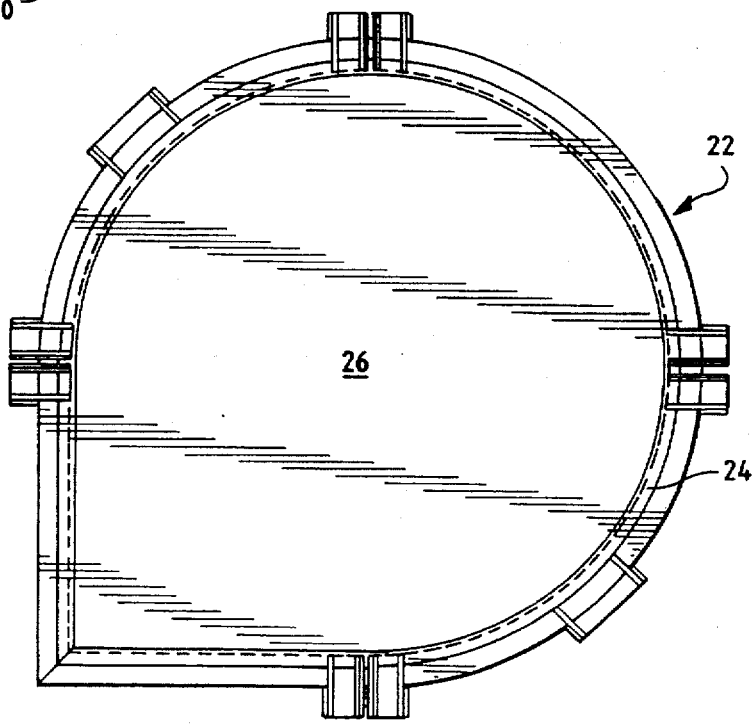
FIG. 3 is a top plan view of the kettle shell of the present invention.
Figure 6:
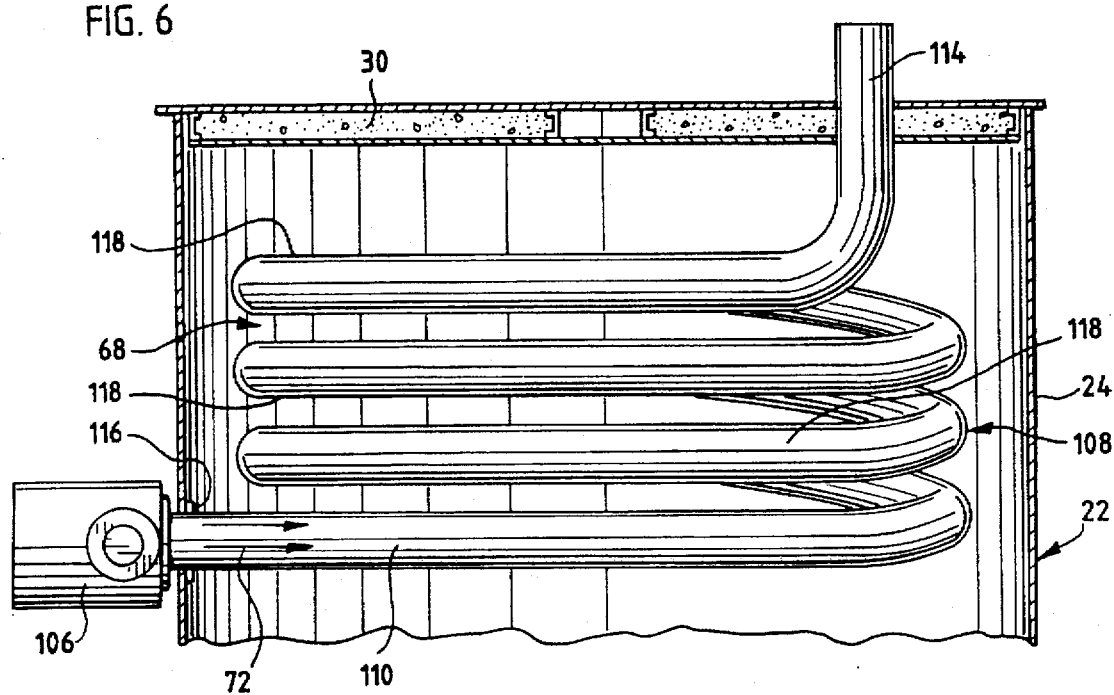
FIG. 6 is a side elevation of the upper burner tube coil of the kettle of FIG. 1.

Finally, as shown in FIGS. 1, 2 and 6, the upper burner tube assembly 68 comprises an upper immersion tube burner 106, mounted in vertical alignment with burners 70 and 90, and an upper burner tube coil 108. Coil 108 has an initial straight tube section 110, a central spiral tube section 112, and terminates in a vertical riser 114, the latter connected above cover 30 to the common flue stack 81. The initial straight tube section 110 is mounted to the kettle shell wall 24 by a mounting plate 116; it connects to the outlet of upper burner 106. Like middle burner tube coil 92, the upper burner tube coil 108 is generally cylindrically-shaped, and horizontally-oriented, and comprised of essentially four coil levels 118. The upper burner tube coil 108, because of the overall length of burner tubing provided by the four coil levels 118, like middle burner tube coil 92, presents enough burner tube surface area to heat the gypsum located within kettle calcining zone C.

It will be understood that the present invention uses heat source means, heating means and circulating means to circulate a heated media within the kettle 22 to entirely heat its contents. For example, the heat source means can comprise burners 70, 90, and 106, and the heating means and circulating means can comprise heat transfer apparatus in the form of the multiple burner tube coils 74, 92, and 108. Further, the heated media circulated within the burner tube coils can comprise heated combustion gases (i.e., from flames 72) circulated in coils 74, 92, and 108.

As seen in FIGS. 2, 3, 4B and 5B, due to the preferred substantially teardrop cross-sectional shape of kettle 22, an elongated area for the initial burner tube piping is available. That is, the respective immersion tube burners 70, 90, and 106 are mounted adjacent the "point" of the teardrop-shaped kettle 22 (see FIG. 2), such that that teardrop kettle shape allows the burners to be tangentially introduced to the kettle, i.e., via a flat surface. In this way, the initial straight burner tube sections 76, 94, and 110, all preferably formed of stainless steel pipe, are advantageously of sufficient length to prevent the gas flames 72 from directly impinging on any interior burner tube wall surface. This permits extended life and reduced maintenance for burner tube coils 74, 92, and 108.

In one embodiment designed in accordance with the present invention, the overall vertical dimension of the kettle 22 (FIG. 1) was approximately 15 feet, and the diameter of the kettle 22 was approximately 15 feet. Further, the thickness of the kettle shell wall 24 was approximately ¾ inch, as was the thickness of the kettle bottom 26. The overall diameter (denoted by dimension D in FIG. 5B) of the respective burner tube coil sections 92, 108 (and of outer coils 85 of tube coil 74) was approximately 8 feet, while that for the inner coils 83 (of lower burner tube coil 74) was 6 feet. The diameter of the tube sections making up the respective burner tube coils 74, 92, and 108 was nominally 8 inches. The sidewall thickness of such coil tube sections was ½ inch. The length of the initial straight tube sections 76, 94, and 110 was approximately 5 feet, while the overall length of each of burner coils 74, 92, and 108 was approximately 75 feet. That resulted in each burner tube coil 74, 92, and 108 having a total useable exterior surface area for heat transfer of approximately 23,000 sq. inches. The respective immersion tube burner units 70, 90, and 106, each had an approximate output of 5,000,000 BTUs. It is to be understood that such a maximum BTU output for the burners 70, 90 and 106 could readily change should higher capacity burners become commercially available.

It is to be understood that one needs a certain length of burner tube coil (74, 92, 108) to contain sufficient hot gas in kettle 22 such that the resulting heat transfer from such burner coils' respective exterior surface areas will heat up the material 42 in a given calcining zone to a temperature range of 290° F. to 310° F., and preferably 300° F., at approximately "80% plus" burner tube efficiency. Also, it is known from prior experience and prior kettle design usage that the required amount of heat (per ton of gypsum material to be calcined) is typically around 750,000 BTUs per ton of new material. Further, with prior art calcining processes and apparatus, the required so-called "retention time" for new gypsum material 34 to be retained within the kettles, i.e., material time in through material time out, was generally thought to be for a minimum period of 30 minutes. However, in prior art kettles it was typically 80 to 90 minutes residence time to get uniform quality calcined gypsum.

With the present invention that residence time is expected to drop to approximately 40–45 minutes. When running at full capacity, it is believed that each immersion tube burner unit (70, 90, 106) would generate, through its respective burner tube coil, (74, 92, 108) given the above surface area, upwards of approximately 175 BTUs/hour/square inch within its respective calcining zone in kettle 22, at 80% burner efficiency. It is also believed that the temperature difference (between the kettle contents 42 and the respective burner tube coils 74, 92, and 108) decreases as the material being calcined moves up from calcining zones A to C.

It is to be understood that no separate hot pit structure is required for use with the improved calcining kettle apparatus 20 of the present invention. This is because one typically does not need to "dump" the present kettle 22, such as at kettle shut-off or for kettle exterior maintenance matters, since unlike prior art kettles having refractory structures, the present improved calcining kettle 20 does not act as a large heat sink, i.e., does not require a long cool-down period. However, if the kettle apparatus 20 is to be constructed, such as a retrofit installation into an existing stucco kettle line, where a hot pit structure is already built and present, then the dump gate 46 on kettle shell 24 could discharge into such an existing hot pit, if desired.

Importantly, the kettle apparatus 20 of the present invention operates at a substantially reduced external temperature compared to those of prior art designs. As noted, prior art refractory-type kettle structures had to withstand significant elevated operating temperatures, such as 2,000°–2,400° F. On the other hand, the kettle apparatus 20 of the present invention, since the calcining heat is applied internally within the contents via the immersion tube burner coils 74, 92, and 108, the kettle 22 need only retain, not heat, the gypsum 42 being calcined. That is, all of the heat generated by the immersion tube burners is directed via the burner tube coils to the kettle's contents, rather than against the kettle itself. Thus, the kettle shell wall 24 and bottom 26 will normally operate at a much reduced temperature, i.e., of only approximately 300° F. This is the case, notwithstanding the fact that the initial straight burner tube sections 76, 94, and 110 will be heated by the burners 70, 90, and 106 to approximately 1,600°–1,800° F. Further, the temperature of the spent burner gases exhausting from riser tubes 80, 102, and 114 should be approximately 500°–600° F.

Gas-fired immersion tube burners are readily commercially available, such as those made by the following companies: Pillard Combustion (Procedair), of Montreal, Quebec; Eclipse Combustion, of Rockford Ill.; Maxon Corporation, of Muncie, Ind.; and Hauck Manufacturing Co., of Lebanon, Pa. Preferably, the highest capacity gas-fired immersion tube burner is selected, which currently has a capacity limitation of 5,000,000 BTU. Even larger immersion tube burners could be used if commercially available, such as 10,000,000 BTU capacity units, however none are presently known. The fuel for the burners 70, 90, and 106 could be liquified petroleum, i.e., LP gas, or natural gas. They are not intended for use with coal or oil, since that type flame would create unwanted interior coatings to the burner tubes 44, 92, 108.

Figure 8:
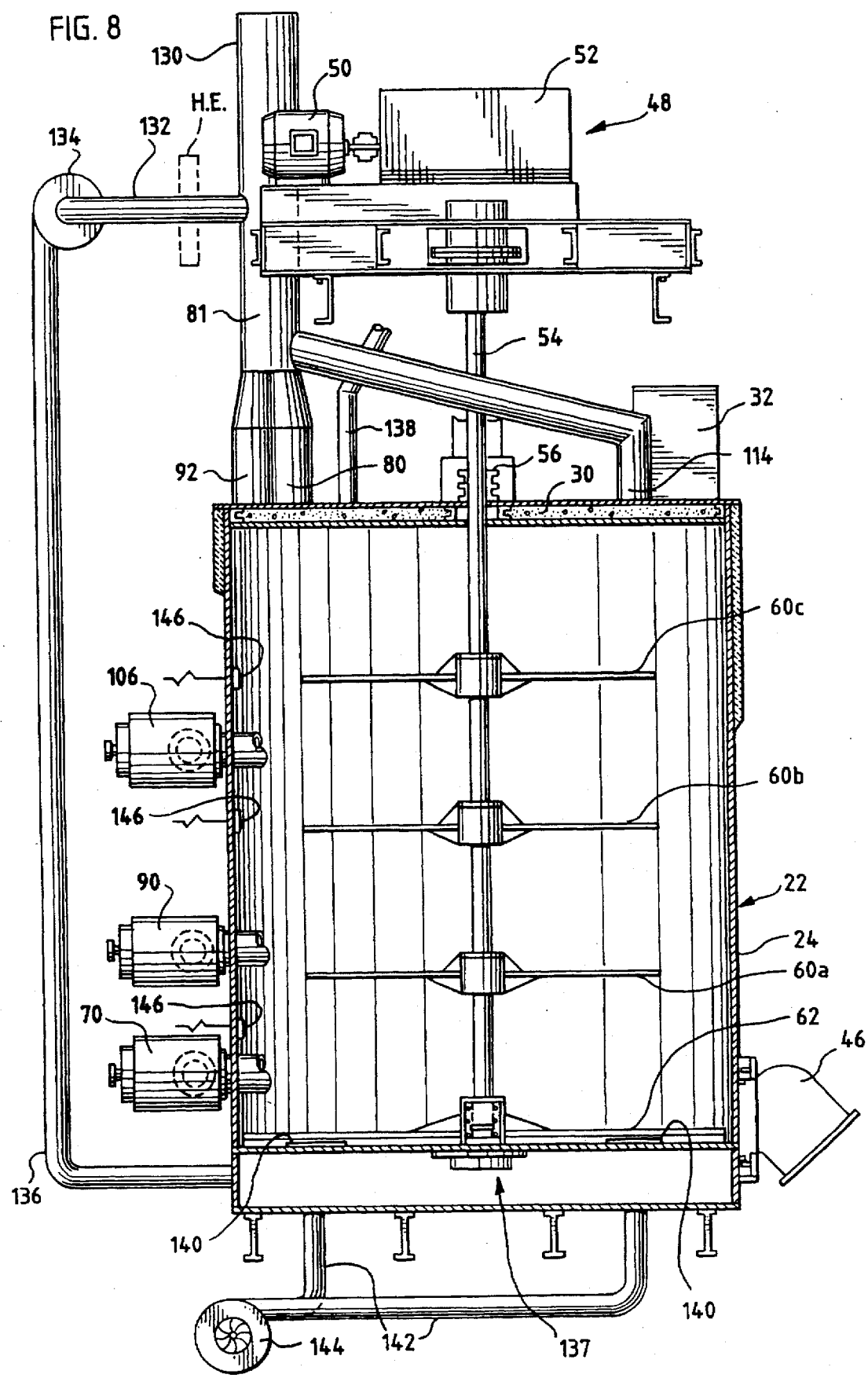
FIG. 8 is a side elevation view, with various parts removed for better viewing, of a modified embodiment of the calcining kettle apparatus of FIG. 1.

If desired, modifications in the form of recycling and aeration means can be made to the improved calcining kettle apparatus 20 of the present invention, as best seen in FIG. 8. That is, one modification can take the form of apparatus for recycling a portion of the spent burner gases in exhaust flue stack 81 through the kettle 22. More specifically, an auxiliary recycle pipe 132 draws a portion of the spent flue gases from stack 81. This occurs through the use of a flue gas recycle blower 134 and a recycle supply pipe 136, which connects to a plenum 137 formed on the bottom of the kettle 22. In this manner, much of the remaining heat in the spent flue gases can be recovered and acts to supplementally heat the kettle contents 42. Such exhaust flue gases, which have dropped to around 500°–600° F., i.e., no longer at their initial input temperature of 1,800° F., are of low enough temperature that they would not easily create unwanted dead burn material within the kettle contents 42. However, because such recycled flue gases would now act to directly contact and bubble up through the kettle contents 42, via plenum 137 and pads 140, an enlarged dust collector (not shown) might be required to connect to the dust collector supply pipe 138.

Alternatively, a heat exchanger could be used with recycle pipe 132. For example, see the phantom-outlined heat exchanger box in FIG. 8, generally denoted by reference letters H.E., which could be used to heat fresh air with recycled heated combustion gases from flue 130, and supply the heated fresh air to the recycle blower 134.

Further, if desired, direct kettle-bottom aeration of the kettle contents can be added. This would provide increased fluidization of the kettle contents 42. That is, as best seen in FIG. 8, a modification of kettle 22 for aeration purposes can be aeration means taking, for example, the form of the aeration pads 140 formed on the interior surface of kettle bottom 26; they would be supplied with forced, unheated aeration air via plenum 137, pipes 142 and blower 144. Use of such supplemental aeration apparatus might also require use of an increased size dust collector (not shown), versus that size as used with kettle 22 when no aeration apparatus or flue gas recycling equipment is present. Use of such forced aeration within a calcining kettle helps the gypsum material 42 flow better within the kettle. This gives more assurance that there are no so-called "heating dead spots" within the kettle. This modification would be particularly helpful with material fluidity in those areas in kettle 22 where the burner tubes straight sections 76, 94, and 110 are in vertical alignment with one another. Importantly, such kettle bottom aeration was not available with the known prior art kettle designs which had refractory pits. That is because it would have interfered with the burners positioned underneath the prior art kettles, plus it was at a location too hot to be operable. It will be understood that either or both such modifications (i.e., flue gas recycling and/or forced aeration) can be used with the present improved kettle apparatus 20, as desired.

Further, instead of using gas-fired immersion tube burners 70, 90, and 106, other sources of heated media (besides heated combination gases) could be used for, i.e., circulated in, the tube coils. For example, if the improved calcining apparatus 20 was located adjacent a reliable supply of steam, such as close to an electric generating plant, for example, then steam could be used as the heated media circulated within the burner tube assemblies 64, 66, and 68. Even other sources of heat could be used, such as heated oil.

As seen in FIG. 9, an alternate embodiment of the present invention concerns a differently-shaped calcining kettle apparatus, generally denoted by reference numeral 150, again provided with a multiple series of burner apparatus. That is, the calcining apparatus 150 includes a round-shaped kettle 152 (in cross section), and similar to the preferred embodiment's kettle apparatus 20, a multiple series of vertically-aligned immersion tube burners and associated burner tube coils, the uppermost two of which burners are respectively generally denoted by reference numerals 154 and 155, and the uppermost burner tube coil denoted by reference numeral 156. Each burner, such as the gas-fired immersion tube burner 154, is mounted to the exterior of the round kettle 152 by a gusseted anchor bracket 158. Each burner tube coil, such as the cylindrically-shaped, horizontally-aligned multi-level upper burner tube coil 156, is mounted interiorly of round kettle 152, yet exhausts exteriorly of the kettle 152 and its cover 160 via an exhaust riser tube 162. An initial straight burner tube section 164 connects the upper burner tube coil 156 through the sidewall of the round kettle 152 to the immersion tube burner 154; similarly, straight sections of the remaining ones of the series of underlying burner tube coils (not shown) connect to their respective exteriorly-mounted burners (not shown, except for a partial depiction of the next lower immersion tube burner 155 in FIG. 9). Preferably, the straight sections 164 are formed of stainless steel tubing. Otherwise the remaining structure, components, and cycle operation of the alternate embodiment's kettle apparatus 150 of FIG. 8 are the same as that of the preferred embodiment's kettle apparatus 20.

Importantly, however, such an alternate round kettle design could be used in retrofit situations where an existing round-shaped calcining kettle is already present. There, the existing jacketing and refractory brick structure (not shown) of an exiting prior art type kettle is removed, and a series of new burners, such as immersion tube burner 154, are exteriorly mounted via brackets 158 to the exiting round kettle. Further, a series of burner tube coils, including the upper tube coil 156, are interiorly-disposed within the existing round kettle, such as kettle 152, to be connected via straight tube sections such as section 164 passing through the existing kettle's sidewall.

Thus, it will be seen that instead of building a wholly new teardrop-shaped kettle 22 of the preferred embodiment, the present invention can be built new, or retrofitted in existing kettle structures, into round-shaped kettle configurations. Such retrofits are much more cost-effective, where existing kettle structure per se can still be used with the improvements of the present invention. Yet even other cross sectional shapes of calcining kettles, instead of teardrop or round, can be used, as desired, without departing from the present invention.

Yet a further embodiment of the present invention is shown in FIG. 10, which concerns an improved calcining kettle apparatus, generally denoted by reference numeral 170, but one which has only a single, rather than multiple, burner tube coil. That is, a kettle 172 (which is shown as circular in cross section, but which can take a teardrop or other shape), has a cover 174, a single immersion tube burner 176, an initial straight burner tube section 178, and a single (i.e., not multiple) burner tube coil 180. The single burner tube coil 180 (but having multiple coil levels) exhausts above, i.e., exteriorly to, the kettle 172 and cover 174 via a single exhaust riser tube 182 which connects to a flue stack (not shown).

The single burner tube coil-type kettle apparatus 170 of the alternate embodiment of FIG. 10 can be utilized in those calcining and gypsum processing and converting operations where less tonnage output is needed, or where a smaller calcining kettle can be used, or where less overall BTU/hour is required. For example, such a modified, single burner tube coil design could be used in a small capacity kettle having an overall diameter of 5 feet and height of 6 feet. Nevertheless, although the alternate kettle apparatus 170 of FIG. 10 has only a single burner tube coil 180, as compared to a series of multiple burner tube coils like used in the preferred embodiment's kettle apparatus 20 and the above-described alternate embodiment's kettle apparatus 150, the operation, components, materials, and construction of modified kettle 172 remains the same as that of kettle 22 and kettle 152.

We turn now to the improved calcining method of the present invention, whereby a specific staging, i.e., positioning, of the immersion tube burners and associated burner tube coils within the kettle helps create a highly-efficient, quick start-up, and low maintenance-type continuous calcining process.

More specifically, during calcining cycle start-up of the improved calcining kettle apparatus 20 of the present invention, the burners 70, 90, and 106 are turned off. The empty kettle 22 is then partially filled, i.e., charged, with gypsum 34 via feed screw conveyor 36 until it covers burner tube coil 74. The gypsum 34 being introduced into kettle 22 is at ambient temperature, i.e., 60°–75° F., for example. Due to the preferably low profile design of the lowest burner tube assembly 64, the initial calcining zone A of kettle 22 is relatively squat, and thus can be quickly filled for start-up purposes. The lower immersion tube burner 70 is then energized, whereby the temperature within the burner tube coil 74 reaches approximately 1,600° F. That continues until the heat transfer via burner tube coil 74 raises the temperature within that initial fill load of gypsum 34 to the range of approximately 290° F. to 310° F., and preferably to approximately 300° F. At this point, the middle calcining zone is filled with an additional charge of gypsum 34 until middle burner tube coil 92 is covered. Middle immersion tube burner 90 is then energized, and this larger fill of material 34 in kettle 22 is again brought to a temperature of approximately 300° F. Then, the final charge of material 34 is introduced to allow calcining zone C to fill up and cover over upper burner tube coil 108, which is then energized. Continued operation of the three burners 70, 90, and 106, all preferably being run at full capacity, cause the entire contents 42 of kettle 22 to be maintained in the calcining temperature range of approximately 290° to 310° F., and preferably at the preferred calcining process temperature of approximately 300° F. That temperature can be sensed by well known heat-sensing means, such as thermocouples 146 mounted in each of zones A, B, and C (see FIGS. 1 and 8)

of kettle 22. Then, an ongoing charge of yet additional ground gypsum 34 is introduced to kettle input riser 32 via feed conveyor 36, to commence the continuous calcining cycle of the present invention. During the calcining cycle there is continuous mixing of the contents 42 of the kettle 22 via mixer blade 60a, b, c and scraper bar 62.

In operation, as new ground gypsum 34 is introduced to kettle 22, its denser weight causes it to fall to the kettle bottom 26. This, in turn, causes the lighter fully-calcined gypsum 42 (which has by now bubbled to the top, as its extra moisture content has been driven off via heating into steam and dust through the dust collector supply pipe 39) to then overflow into discharge cone 40 of outlet tube 44. Thereafter, continued, full capacity operation of burners 70, 90, and 106, coupled with accurate kettle temperature sensing and control of the feed discharge rate via feed conveyor 36, establishes a continuous calcining process in the improved kettle apparatus 20. The temperature of the calcined material, i.e., stucco, exiting the kettle 22 via discharge cone 40 is approximately 300° F., while the exhaust gases exiting the riser tubes 80, 92, and 114 is approximately 500°–600° F.

As seen, due to the above-described, improved calcining method of the present invention, the specific staging, i.e., positioning and successive start-up energizing, of the interiorly-disposed multiple immersion tube burner assemblies allows for quick filling and quick start-up of the entire kettle apparatus 20. This is in great contrast to prior art kettle designs, where during start-up the entire kettle's contents (and refractory structure) had to be slowly heated to operating temperature by one externally applied burner flame.

A significant advantage of the present method is that more calcined gypsum tonnage output can be achieved in a given kettle space, in contrast to prior art designs. That is, the currently used, refractory-type kettle design of the prior art normally produces approximately 11 tons of stucco per hour. In actuality, the limiting factor in most prior art designs was not how much heat could be applied to the kettle, but what amount of heat the refractory kettle bottom could stand without unwanted, rapid deterioration.

However, it is expected that the improved kettle design of the present invention will have a tonnage output of approximately 18–20 tons per hour, for the same size kettle shell as used in the current prior art designs. Further, with the present invention, if even higher capacity burners are used, or a larger number of multiple burners and associated burner tube coils are used, one can get yet even higher tonnage output for the same size kettle. For example, with prior art burner and kettle designs, it is known to take approximately 750,000 BTUs per ton of gypsum to calcine gypsum. Thus, for 15,000,000 BTUs of heat applied (i.e., 3 immersion tube burner units at 5,000,000 BTUs per unit), the present invention will likely have at least an output of approximately 18–20 tons per hour. Thus, for the same size kettle shell, the present invention should provide approximately twice the hourly tonnage output over known, currently-used prior art kettle designs. Also, the efficiency anticipated with the present design kettle should even lower the current requirement of 750,000 BTU's per ton of material to be calcined.

The only remaining real limitation then, is what is the required residence time for the gypsum material 42 within the kettle 22. The current prior art operating optimum of ten tons per hour results from approximately 80–90 minutes of material residence time within a known kettle. However, with the present improved calcining invention, the residence time is expected to be only 40–45 minutes, i.e., only half the current residence time. It is further believed that the present invention's kettle and burner design could even be operated to result in a material residence time of only 30 minutes, yet still result in a stucco product of sufficient high uniformity and homogeniety, i.e., minimum of under- or over-calcined material.

Thus, there are numerous advantages with the improved calcining kettle apparatus and method of the present invention. One significant advantage is the highly efficient heat transfer being provided. That is, rather than losing heat to the exterior refractory brick wall as occurred (with as much as a 10% heat loss) with prior art designs which were kettle-bottom fired, the present invention directs and retains substantially all of the calcining heat (being transferred) within the kettle and its contents. Further, the increased efficiency and generally even dispersion of heat transfer occurring throughout the improved kettle apparatus 20, due to the use of staged coil-type gas immersion tube burners, is expected to result in a higher uniformity of resulting stucco, i.e., calcined gypsum, over prior art designs.

Additionally, because of the use of substantially evenly distributed, i.e., staged, multiple burner coils, there is a significantly less chance to have hot spots in the kettle and to over-calcine the material, and thereby create so-called dead burn material. As known, there was always a chance of creating dead burn material in the "hot zone" formed around the domed-bottom area in prior art refractory-type kettles, or in prior art conical kettles adjacent the submerged combustion tube.

With the present improved invention, a dust collector (not shown) must be used, as connected to dust collector supply pipe 39 (FIG. 1). However, with the present invention it works with substantially cleaner exhaust gases. That is, the dust and steam exhaust produced by the present calcining apparatus and method is much cleaner than that of known prior art kettles. For example, it is anticipated that a dust collector for a kettle made in accordance with the present invention need only handle about 8,000 CFM. of dust. On the other hand, with prior art conical kettles having submerged combustion, for example, the associated dust collector must be sized to handle approximately 40,000 CFM of dust. That improvement alone in the present invention can result in significant energy savings, because of the smaller dust collector. Plus there is less initial capital cost in installing the same, as well as reduced ongoing maintenance costs.

As a further advantage, the present invention's low profile for the initial, lowest burner tube coil permits a shallow material charge during cycle start-up. That, in turn, keeps the load on the agitator motor at a minimum during cycle start-up.

It is to be understood that the present invention, while preferably intended for multi-burner operation (although only one large coil could be alternatively used), is not limited to simply three burners. Neither is it limited to any specific serpentine-coil design for each of the burner coils, or to any specific alignment, such as horizontal, of the burner coils. Further, the invention is not limited to any specific BTU output per burner.

Besides improved efficiency of calcining processes as expected with the present invention, substantially reduced initial capital costs in constructing the present improved calcining process are anticipated, particularly since no heavily-clad, domed-bottom kettle is required, or any surrounding refractory structure. Further, a shorter building, i.e., kettle housing structure, can be built, due to the lack of any of the prior art's exterior burner structure underlying the kettle.

Experience with calcining kettle operations has shown that a substantial percentage, i.e., approximately 90–95%, of all maintenance done on prior art refractory-type kettle designs was in conjunction with the kettle's dome-shaped bottom. Yet the present invention totally eliminates such costly and time-consuming maintenance problems.

From the foregoing, it is believed that those skilled in the art will readily appreciate the unique features and advantages of the present invention over previous types of methods and apparatus for calcining gypsum. Further, it is to be understood that while the present invention has been described in relation to particular preferred and alternate embodiments as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

We claim:

1. A method of calcining gypsum comprising the steps of:

feeding ground gypsum into a calcining kettle which includes at least one interiorly-disposed heating means for circulating a heated media throughout an interior chamber of said kettle without allowing said heated media to contact contents in said kettle, said calcining kettle further including a plurality of distinct calcining zones, each calcining zone having its own interiorly-disposed heating means, and where said heated media provides the heat required to calcine said kettle's contents, said gypsum being fed into the kettle until said heating means is covered;

then, circulating said heated media through said heating means to heat said gypsum material in said kettle to a calcining temperature in the range of about 290° F. to about 310° F., so that said gypsum material becomes calcined;

then, introducing more gypsum material into said kettle to cause the calcined gypsum in said kettle to overflow into a recovery means for receiving said calcined gypsum from said kettle.

2. The method of claim 1 in which said step of introducing more gypsum material into said kettle includes continuously introducing new gypsum material at a rate so that at least approximately 18 tons of said calcined gypsum overflows into said recovery means per hour.

3. A method of calcining gypsum comprising the steps of:

feeding an initial charge of ground gypsum material into a calcining kettle having multiple calcining zones, including at least a lower calcining zone, and an upper calcining zone, which said calcining zones respectively include a lower burner tube coil and an upper burner tube coil, said gypsum being feed into the kettle until said lower burner tube coil is covered;

then, circulating a heated media through said lower burner tube coil so as to heat said initial gypsum charge;

then, once said initial gypsum charge reaches a temperature in the range of approximately 290° to 310° F., feeding a second charge of ground gypsum material into said kettle until said upper burner tube coil is covered;

then, circulating a heated media through said upper burner tube coil so that the entire charge of said gypsum reaches a temperature in the range of approximately 290° to 300° F. and becomes calcined; and then, maintaining the temperature of said calcined gypsum in the kettle at a temperature in the range of approximately 290° to 310° F., while introducing more gypsum material into said kettle so that the calcined gypsum in said kettle overflows into a recovery means for receiving said calcined gypsum from said kettle, thereby providing a continuous calcining operation.

4. The method of claim 3 in which said steps of circulating a heated media through said burner tube coils include circulating heated gasses through said burner tube coils.

5. The method of claim 4 further comprising the step of exhausting said heated gasses from the burner tube coils, said heated gas exhausts exteriorly of said kettle.

6. The method of claim 5 in which said exhausting step includes exhausting exhaust gasses from said burner tube coils through riser pipes connected to a common flue stack.

7. The method of claim 6 comprising the further step of partially recycling said exhaust gasses by removing a portion of said exhaust gasses from said common flue stack and recirculating said removed exhaust gasses through said gypsum within said kettle so as to further heat said gypsum.

8. The method of claim 2 in which said step of recirculating said removed exhaust gases comprises introducing said removed exhaust gases adjacent to the bottom of said kettle.

9. The method of claim 3 in which said heated media comprises one of heated combustion gases or heated oil or steam.

10. The method of claim 3 comprising the further step of mixing said gypsum within said kettle during said step of maintaining the temperature of said gypsum at a temperature in the range of approximately 290° to 310° F.

11. The method of claim 10 in which said mixing step includes actuating a vertically-extending shaft in said kettle which shaft is connected to at least a lower mixing blade and an upper mixing blade, said mixing blades being respectively positioned proximal to said lower calcining zone and said upper calcining zone.

12. The method of claim 10 in which said mixing step further includes mixing said gypsum by aerating said gypsum within said kettle.

* * * * *